US010073963B2

(12) United States Patent
Tse et al.

(10) Patent No.: US 10,073,963 B2
(45) Date of Patent: *Sep. 11, 2018

(54) CLAIMING DATA FROM A VIRTUAL WHITEBOARD

(71) Applicant: Microsoft Technology Licensing, LLC, Redmond, WA (US)

(72) Inventors: David Tse, Kirkland, WA (US); Nathaniel Stott, Redmond, WA (US); Jason Lowell Reisman, Seattle, WA (US); Brian T. Albrecht, Kirkland, WA (US); Matthew C. Pohle, Bellevue, WA (US); Isaiah Ng, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,288

(22) Filed: Sep. 20, 2016

(65) Prior Publication Data
US 2017/0011227 A1 Jan. 12, 2017

Related U.S. Application Data

(63) Continuation of application No. 14/516,497, filed on Oct. 16, 2014, now Pat. No. 9,552,473.
(Continued)

(51) Int. Cl.
*G06F 21/36* (2013.01)
*G06K 9/00* (2006.01)
(Continued)

(52) U.S. Cl.
CPC ............. *G06F 21/36* (2013.01); *G06F 21/31* (2013.01); *G06F 21/32* (2013.01); *G06F 21/35* (2013.01);
(Continued)

(58) Field of Classification Search
CPC .......... G06F 21/36; G06F 21/32; G06F 21/31; G06F 21/62; G06F 21/6227; G06F 21/82; G06F 21/84
See application file for complete search history.

(56) References Cited

U.S. PATENT DOCUMENTS 5,790,114 A 8/1998 Geaghan et al.
6,038,295 A 3/2000 Mattes
(Continued)

FOREIGN PATENT DOCUMENTS

EP 1936483 A1 6/2008
WO 2009143294 A2 11/2009
WO 2010030610 A1 3/2010

OTHER PUBLICATIONS

Lienhard et al., Multi-Layer Recording as a New Concept of Combining Lecture Recording and Students Handwritten Note, 2002, 4 pages.*
(Continued)

*Primary Examiner* — Hadi S Armouche
*Assistant Examiner* — Huan V Doan
(74) *Attorney, Agent, or Firm* — Alleman Hall Creasman & Tuttle LLP

(57) ABSTRACT

A method of storing data from a whiteboard application executed on a computing system including an interactive display device is provided. The method comprises storing, in a memory of the computing system, whiteboard data input to the whiteboard application in response to user interaction with the interactive display device, displaying a login selector on the interactive display device, upon detecting actuation of the login selector, identifying the user based on credentials of the user; and in response to identifying the user, (i) retrieving previews of stored whiteboard files from a user account in a cloud-based storage system corresponding to the identity of the user, (ii) displaying the previews on
(Continued)

the interactive display device, and (iii) uploading the whiteboard data as a whiteboard file from the memory of the computing system to the user account.

11 Claims, 7 Drawing Sheets

Related U.S. Application Data

(60) Provisional application No. 61/996,781, filed on May 14, 2014.

(51) Int. Cl.
*G06F 21/62* (2013.01)
*G06F 21/31* (2013.01)
*G06F 21/32* (2013.01)
*G06F 21/35* (2013.01)

(52) U.S. Cl.
CPC ..... *G06F 21/6218* (2013.01); *G06K 9/00161* (2013.01); *G06K 9/00221* (2013.01); *G06K 9/00288* (2013.01)

(56) References Cited

U.S. PATENT DOCUMENTS

| | | |
|---|---|---|
| 6,108,444 A | 8/2000 | Syeda-Mahmood |
| 6,256,028 B1 | 7/2001 | Sanford et al. |
| 6,501,463 B1 | 12/2002 | Dahley et al. |
| 6,781,611 B1 | 8/2004 | Richard |
| 6,953,803 B1 | 10/2005 | Bloomberg et al. |
| 7,039,234 B2 | 5/2006 | Geidl et al. |
| 7,043,529 B1 | 5/2006 | Simonoff |
| 7,409,089 B2 | 8/2008 | Simmons et al. |
| 7,508,354 B1 | 3/2009 | Sanders et al. |
| 7,587,675 B2 | 9/2009 | Cunningham et al. |
| 7,725,527 B2 | 5/2010 | Janssen et al. |
| 7,823,077 B2 | 10/2010 | Kurtz et al. |
| 7,925,987 B2 | 4/2011 | Gounares et al. |
| 7,961,943 B1 | 6/2011 | Zeevi |
| 8,166,388 B2 | 4/2012 | Gounares et al. |
| 8,244,233 B2 | 8/2012 | Chang et al. |
| 8,254,704 B2 | 8/2012 | Lu et al. |
| 8,271,887 B2 | 9/2012 | Offer et al. |
| 8,334,902 B2 | 12/2012 | Golovchinsky et al. |
| 8,593,502 B2 | 11/2013 | Saleh et al. |
| 8,594,467 B2 | 11/2013 | Lu et al. |
| 8,635,531 B2 | 1/2014 | Graham et al. |
| 8,682,973 B2 | 3/2014 | Kikin-Gil et al. |
| 8,751,534 B2 | 6/2014 | Kawano et al. |
| 9,319,356 B2 | 4/2016 | Odell et al. |
| 9,477,376 B1 | 10/2016 | Stout et al. |
| 2002/0113773 A1 | 8/2002 | McDonnell et al. |
| 2004/0122873 A1 | 6/2004 | Wright, Jr. et al. |
| 2004/0128354 A1 | 7/2004 | Horikiri et al. |
| 2004/0196313 A1 | 10/2004 | Wynn et al. |
| 2005/0091302 A1 | 4/2005 | Soin et al. |
| 2005/0238156 A1 | 10/2005 | Turner |
| 2007/0174429 A1 | 7/2007 | Mazzaferri et al. |
| 2007/0216660 A1* | 9/2007 | Sposato ............... G06F 3/0488 345/173 |
| 2007/0296997 A1 | 12/2007 | Taneda |
| 2008/0086370 A1 | 4/2008 | Narayanaswami et al. |
| 2008/0170789 A1 | 7/2008 | Thacker |
| 2008/0174568 A1 | 7/2008 | Kim |
| 2008/0232690 A1 | 9/2008 | Saund et al. |
| 2008/0248834 A1 | 10/2008 | Chatterjee et al. |
| 2009/0007009 A1 | 1/2009 | Luneau et al. |
| 2009/0119604 A1* | 5/2009 | Simard ............... G06Q 10/10 715/757 |
| 2009/0147958 A1* | 6/2009 | Calcaterra ............ H04L 9/0822 380/260 |
| 2009/0244278 A1 | 10/2009 | Taneja et al. |
| 2010/0060549 A1 | 3/2010 | Tsern |
| 2010/0064228 A1 | 3/2010 | Tsem |
| 2010/0171754 A1 | 7/2010 | Hatfield et al. |
| 2010/0201891 A1 | 8/2010 | Laroia et al. |
| 2010/0250497 A1* | 9/2010 | Redlich ................ F41H 13/00 707/661 |
| 2010/0262673 A1 | 10/2010 | Chang et al. |
| 2010/0302141 A1 | 12/2010 | Shankar et al. |
| 2010/0332563 A1 | 12/2010 | Fujikawa |
| 2011/0083109 A1 | 4/2011 | Hildebrandt et al. |
| 2011/0138314 A1 | 6/2011 | Mir et al. |
| 2011/0179352 A1 | 7/2011 | Treadwell et al. |
| 2011/0246875 A1 | 10/2011 | Parker et al. |
| 2011/0265034 A1* | 10/2011 | Garin ................... G06F 3/0425 715/810 |
| 2012/0124484 A1 | 5/2012 | Robinson et al. |
| 2012/0204093 A1 | 8/2012 | Habarakada et al. |
| 2012/0226742 A1 | 9/2012 | Momchilov et al. |
| 2012/0229425 A1 | 9/2012 | Barrus et al. |
| 2012/0233615 A1* | 9/2012 | Barrus ................... G06F 21/31 718/100 |
| 2012/0278738 A1 | 11/2012 | Kruse et al. |
| 2013/0019182 A1 | 1/2013 | Gil et al. |
| 2013/0047093 A1 | 2/2013 | Reuschel et al. |
| 2013/0054636 A1* | 2/2013 | Tang ................. G06F 17/30722 707/769 |
| 2013/0065538 A1 | 3/2013 | Kim |
| 2013/0144950 A1 | 6/2013 | Sanakaranarasimhan et al. |
| 2013/0218978 A1 | 8/2013 | Weinstein et al. |
| 2013/0226444 A1 | 8/2013 | Johansson et al. |
| 2013/0246644 A1 | 9/2013 | Garcia et al. |
| 2013/0275885 A1 | 10/2013 | Spataro et al. |
| 2013/0290416 A1 | 10/2013 | Nelson et al. |
| 2013/0321314 A1 | 12/2013 | Oh et al. |
| 2014/0019905 A1 | 1/2014 | Kim et al. |
| 2014/0040767 A1 | 2/2014 | Bolia |
| 2014/0068496 A1 | 3/2014 | Kim et al. |
| 2014/0125580 A1 | 5/2014 | Eun et al. |
| 2014/0149880 A1 | 5/2014 | Farouki |
| 2014/0160153 A1 | 6/2014 | Singh |
| 2014/0172996 A1 | 6/2014 | Deeter et al. |
| 2014/0215336 A1 | 7/2014 | Gardenfors et al. |
| 2014/0223334 A1 | 8/2014 | Jensen et al. |
| 2014/0282077 A1 | 9/2014 | Wilson et al. |
| 2014/0331166 A1 | 11/2014 | Li |
| 2014/0356843 A1 | 12/2014 | Yang et al. |
| 2014/0362165 A1* | 12/2014 | Ackerman .......... H04L 65/4076 348/14.07 |
| 2015/0161483 A1* | 6/2015 | Allen .................. G06F 21/6245 382/118 |
| 2015/0242397 A1 | 8/2015 | Zhuang |

OTHER PUBLICATIONS

Geyer et al., The design and the security concept of a collaborative whiteboard, 9 pages (Year: 2000).*

Gericke, L. et al., "Message Capturing as a Paradigm for Asynchronous Digital Whiteboard Interaction," Proceedings of the 6th IEEE International Conference on Collaborative Computing: Networking, Applications and Worksharing (CollaborateCom 2010), Oct. 9, 2010, Chicago, Illinois, 10 pages.

Adahl, J., "Shared Resource for Collaborative Editing over a Wireless Network," Master of Science Thesis, Chalmers University of Technology, University of Gothengburg, Department of Computer Science and Engineering, Dec. 2010, 274 pages.

"Deskscribble for Mac OS X—Scribble on top of your Desktop, on a Whiteboard or Blackboard," Deskscribble Website, Retrieved Jun. 19, 2014 at http:///www.deskscribbleapp.com/, Available as Early as May 14, 2011, 2 pages.

Schauland, D., "Easy whiteboarding with ScreenChomp for iPad," TechRepublic Website, Available Online at www.techrepublic.com/blog/apple-in-the-enterprise/easy-whiteboarding-with-screenchomp-for-ipad/, Aug. 3, 2011, 8 pages.

"Ink Serialization Sample (Windows)," Microsoft Website, Retrieved Oct. 27, 2015 at https://msdn.microsoft.com/EN-US/LIBRARY/WINDOWS/DESKTOP/MS698127(V=VS.85).ASPX, Available as Early as Oct. 10, 2011, 4 pages.

(56) References Cited

OTHER PUBLICATIONS

IMS Global Learning Consortium, Inc., "IMS GLC IWB/CFF Specification," Version 1.0 Final Specification, Available Online at https://www.imsglobal.org/specificationdownload.cfm, Feb. 1, 2012, 44 pages.
"MyScript Calculator—Handwriting calculator on the App Store on iTunes," Apple Website, Retrieved Jun. 19, 2014 at https://itunes.apple.com/us/app/myscript-calculator/id578979413?mt=8, Available as Early as Feb. 4, 2013, 3 pages.
Jeffers, "Whiteboard Like Apps," University of Delaware Website, Available Online at http://sites.udel.edu/ipads/2013/02/21/whiteboard-like-apps/, Feb. 21, 2013, 5 pages.
Teachthought Staff, "8 Apps to Turn Your iPad Into a Digital Whiteboard," Teachthought Website, Available Dnline at http://www.teachthought.com/apps-2/7-apps-to-turn-your-ipad-into-a-digital-whiteboard/, Feb. 23, 2013, 14 pages.
Li, J. et al., "iScreen: A Merged Screen of Local System with Remote Applications in a Mobile Cloud Environment," Proceedings of the IEEE Seventh International Symposium on Service-Oriented System Engineering (SOSE), Mar. 25, 2013, Redwood City, California, 9 pages.
Smorkalov, A. et al., "Collaborative Work with Large Amount of Graphical Content in a 3D Virtual World," Proceedings of the 2013 International Conference on Interactive Collaborative Learning (ICL), Sep. 25, 2013, Kazan, Russia, 10 pages.
"Blackboard Collaborative Web Conferencing: Essentials for Participants," Version 12.6, Retrieved Online at www.blackboard.com/docs/documentation.htm?DocID=611004PDF, Nov. 1, 2013, 126 pages.
Bradford, K., "Galaxy Note 10.1 2014 Edition Review," Liliputing Website, Available Online at http://liliputing.com/2013/11/galaxy-note-10-1-2014-edition-review-incomplete.html, Nov. 23, 2013, 14 pages.
Kolb, J. et al., "Exploiting User Interest in Data-Driven Cloud-based Mobile Optimization," Proceedings of the 2014 2nd IEEE International Conference on Mobile Cloud Computing, Services, and Engineering (Mobilecloud '14), Apr. 8, 2014, Oxford, United Kingdom, 8 pages.
"Lotus Sametime Quick Start Guide: Save Meeting Information and View It Later," Pinkbird Website, Retrieved Jun. 17, 2014 at http://pinkbird.com/sametime/stquickstartguide/H_SAVE_MEETING_INFORMATION_AND_VIEW_IT_LATER_942_OVER.html, 4 pages.
"BrightLink Pro Collaborative Whiteboarding Solution," Epson Website, Retrieved Jun. 19, 2014 at http://www.epson.com/cgi-bin/Store/jsp/Landing/brightlink-pro-collaborative-whiteboarding-solution.do, 4 pages.
ISA European Patent Office, International Search Report and Written Opinion Issued in Application No. PCT/US2014/040144, dated Sep. 8, 2014, WIPO, 11 pages.
ISA European Patent Office, International Search Report and Written Opinion Issued in Application No. PCT/US2015/030458, dated Jul. 29, 2015, WIPO, 11 pages.
ISA European Patent Office, International Search Report and Written Opinion Issued in Application No. PCT/US2015/030456, dated Aug. 6, 2015, WIPO, 12 pages.
ISA European Patent Office, International Search Report and Written Opinion Issued in Application No. PCT/US2015/030455, dated Aug. 12, 2015, WIPO, 9 pages.
ISA European Patent Office, International Search Report and Written Opinion Issued in Application No. PCT/US2015/030454, dated Aug. 21, 2015, WIPO, 11 pages.
ISA European Patent Office, Invitation to Pay Additional Fees and, Where Applicable, Protest Fee Issued in Application No. PCT/US2015/030452, dated Sep. 22, 2015, WIPO, 5 pages.
ISA European Patent Office, International Search Report and Written Opinion Issued in Application No. PCT/US2015/030452, dated Nov. 5, 2015, WIPO, 17 pages.
United States Patent and Trademark Office, Office Action Issued in U.S. Appl. No. 14/516,497, dated Dec. 2, 2015, 21 pages.
IPEA European Patent Office, Written Opinion of the International Preliminary Examining Authority Issued in Application No. PCT/US2015/030455, dated Mar. 29, 2016, WIPO, 5 pages.
IPEA European Patent Office, Written Opinion of the International Preliminary Examining Authority Issued in Application No. PCT/US2015/030452, dated May 11, 2016, WIPO, 9 pages.
United States Patent and Trademark Office, Notice of Allowance Issued in U.S. Appl. No. 14/516,497, dated Jun. 8, 2016, 17 pages.
IPEA European Patent Office, International Preliminary Report on Patentability Issued in Application No. PCT/US2015/030455, dated Jul. 21, 2016, WIPO, 6 pages.
IPEA European Patent Office, International Preliminary Report on Patentability Issued in Application No. PCT/US2015/030452, dated Aug. 5, 2016, WIPO, 10 pages.
United States Patent and Trademark Office, Corrected Notice of Allowance Issued in U.S. Appl. No. 14/516,497, dated Nov. 7, 2016, 2 pages.
United States Patent and Trademark Office, Non-Final Office Action issued in U.S. Appl. No. 14/493,085, dated Sep. 27, 2016, 13 pages.
United States Patent and Trademark Office, Non-Final Office Action issued in U.S. Appl. No. 14/555,458, dated Jan. 12, 2017, 14 pages.
United States Patent and Trademark Office, Final Office Action Issued in U.S. Appl. No. 14/493,085, dated Apr. 13, 2017, 14 pages.
United States Patent and Trademark Office, Final Office Action Issued in U.S. Appl. No. 14/555,458, dated Apr. 21, 2017, 15 pages.
"Office Action Issued in European Patent Application No. 15726793.1", dated Sep. 12, 2017, 11 Pages.
"Final Office Action Issued in U.S. Appl. No. 14/493,085", dated Jan. 31, 2018, 12 Pages.
"Final Office Action Issued in U.S. Appl. No. 14/522,539", dated Dec. 8, 2017, 21 Pages.
"Final Office Action Issued in U.S. Appl. No. 14/555,458", dated Jan. 30, 2018, 21 Pages.
"Non-Final Office Action Issued in U.S. Appl. No. 14/493,085", dated Aug. 17, 2017, 13 Pages.
"Non-Final Office Action Issued in U.S. Appl. No. 14/522,525", dated Sep. 8, 2017, 13 Pages.
"Non-Final Office Action Issued in U.S. Appl. No. 14/522,539", dated Aug. 11, 2017, 24 Pages.
"Non-Final Office Action Issued in U.S. Appl. No. 14/555,458", dated Sep. 11, 2017, 18 Pages.

* cited by examiner

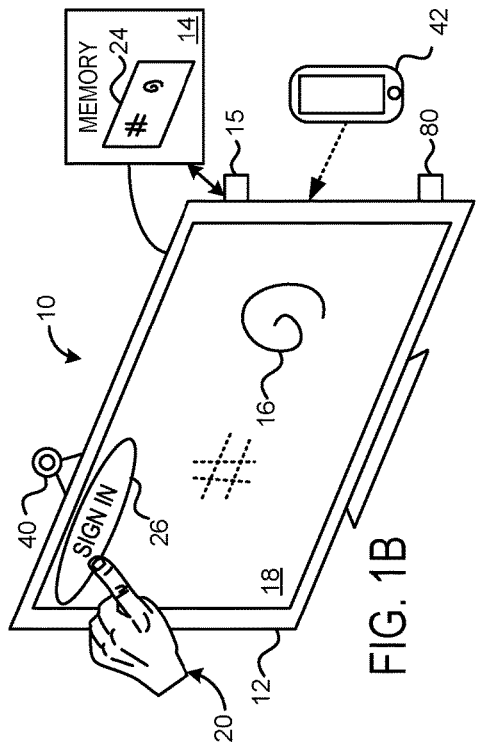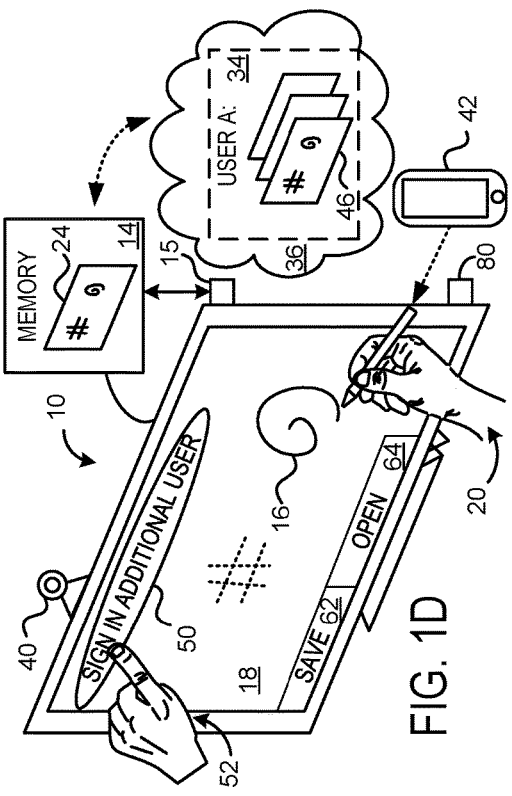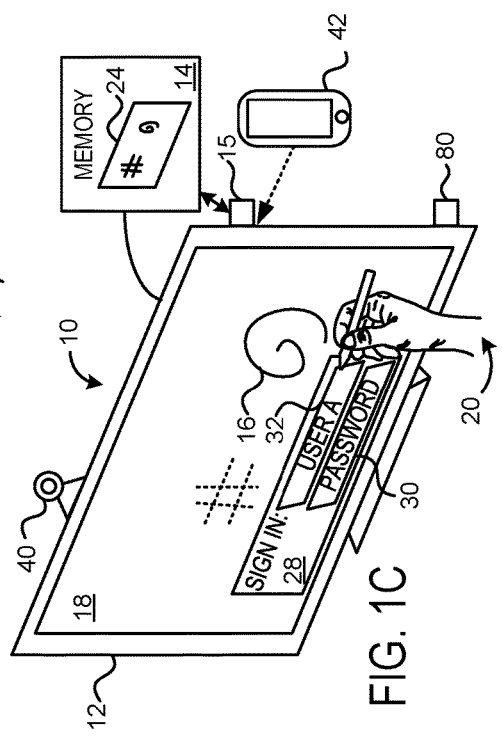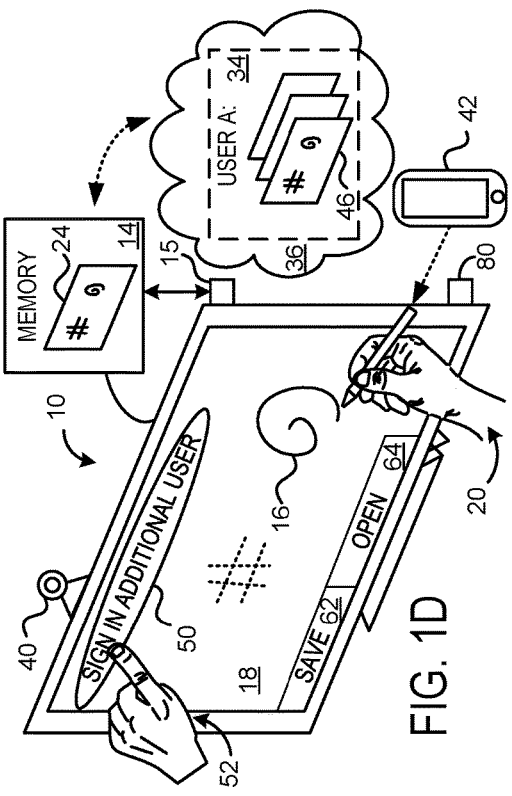

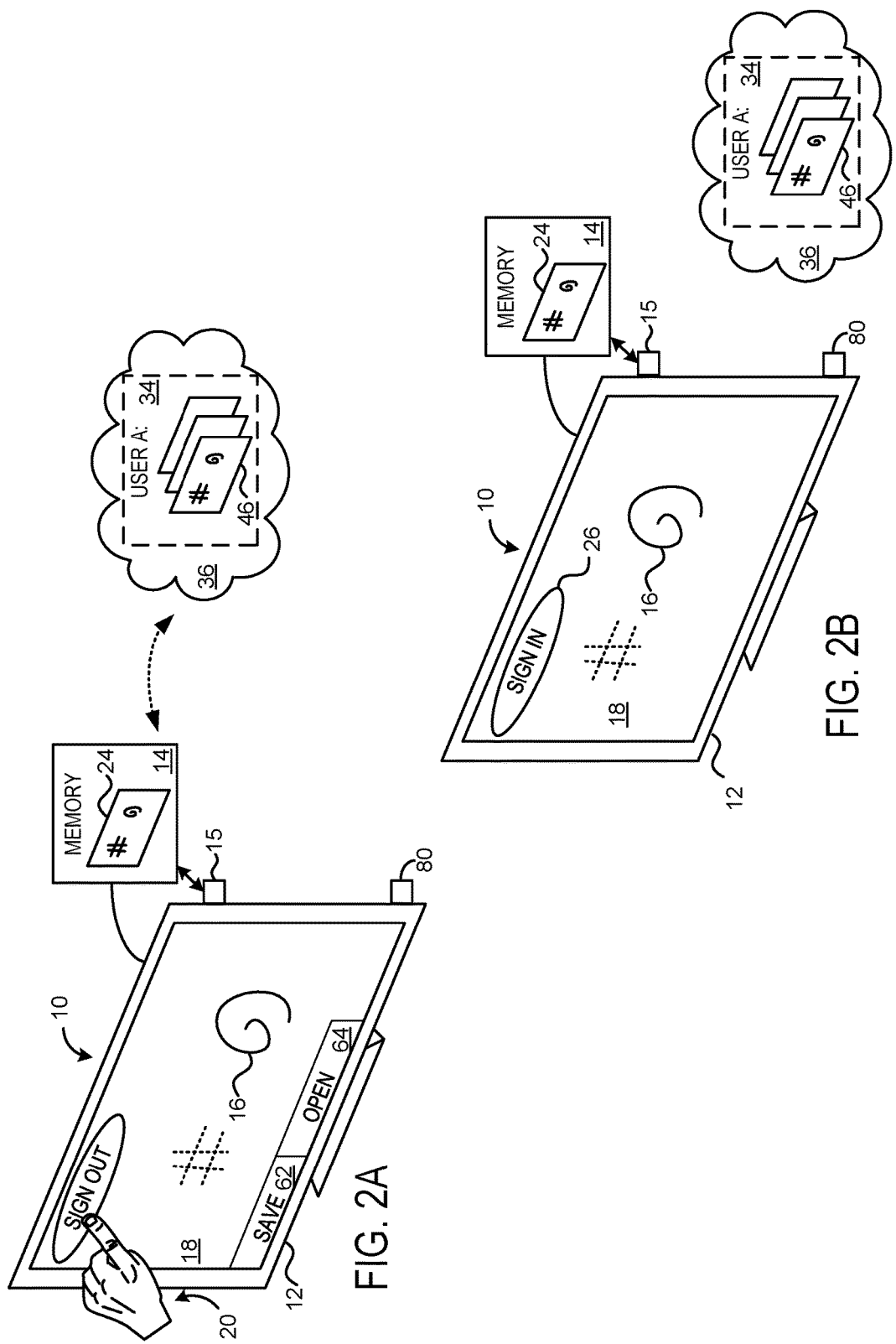

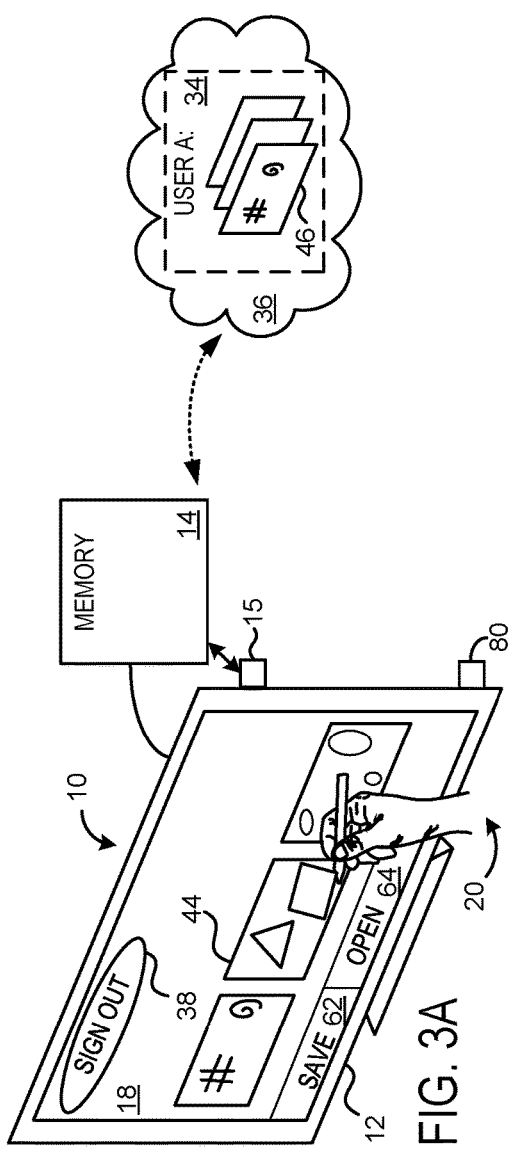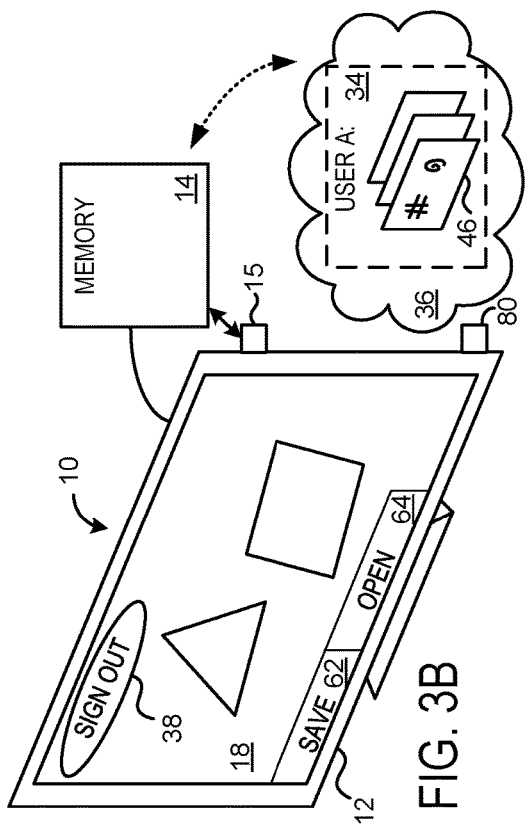

CLAIMING DATA FROM A VIRTUAL WHITEBOARD

CROSS REFERENCE TO RELATED APPLICATION

This application is a continuation from U.S. application Ser. No. 14/516,497, filed on Oct. 16, 2014, which claims priority to U.S. Provisional Patent Application No. 61/996,781, entitled "CLAIMING DATA FROM A VIRTUAL WHITEBOARD" filed on May 14, 2014, the entire disclosures of each of which are herein incorporated by reference.

BACKGROUND

Prior whiteboard applications have been used via computer systems, enabling displayed content to be drawn upon or otherwise manipulated via input devices such as mice, trackpads, touchscreens, etc. In this way, the whiteboard application can provide the functionality of a physical dry-erase or chalkboard in a computing context. Whiteboard applications are commonly used in collaborative settings such as meetings, brainstorming sessions, classrooms, etc. Therefore, in some instances a plurality of users may manipulate content presented via the whiteboard application in one or more sessions. The data associated with the manipulation of the content may be saved locally by the computing system. However, the computing system using the whiteboard application may be used by a number of users. Therefore, storing the data locally may create security concerns. Furthermore, storing the data locally may increase the amount of storage needed in the computing system. Therefore, offloading the content may be desirable to alleviate the security concerns and decrease local storage needs. However, offloading the content to a portable storage device (e.g., thumbdrive), for example, can be cumbersome and require many awkward steps involving numerous input commands. Consequently, it may be inefficient for one or more users to offload the content quickly during a collaborative session. As a result, users may find interaction with the whiteboard application slow and awkward. Moreover, it may be difficult to upload the offloaded content for use in a subsequent whiteboard session, leading to additional interactive inefficiency.

SUMMARY

A method of storing data from a whiteboard application executed on a computing system including an interactive display device is provided. The method comprises storing, in a memory of the computing system, whiteboard data input to the whiteboard application in response to user interaction with the interactive display device, displaying a login selector on the interactive display device, upon detecting actuation of the login selector, identifying the user based on credentials of the user; and in response to identifying the user, (i) retrieving previews of stored whiteboard files from a user account in a cloud-based storage system corresponding to the identity of the user, (ii) displaying the previews on the interactive display device, and (iii) uploading the whiteboard data as a whiteboard file from the memory of the computing system to the user account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A depicts a computing system configured to store data from a whiteboard application executed on the computing system.

FIG. 1B depicts the computing system of FIG. 1A further configured to display a login selector on an interactive display device.

FIG. 1C depicts the computing system of FIG. 1A further configured to identify the user via a sign in prompt requesting the user enter a user ID and a password.

FIG. 1D depicts the computing system if FIG. 1A further configured to access a user account on a cloud-based storage system.

FIG. 2A depicts the computing system of FIGS. 1A-1D further configured to display a logout selector on the interactive display device.

FIG. 2B depicts the operation of the logout selector of FIG. 2A.

FIG. 3A depicts the computing system of FIGS. 1A-1D further configured to retrieve previews of stored whiteboard files from the user account on the cloud-based storage system.

FIG. 3B depicts the computing system of FIG. 3A configured to display a stored whiteboard file corresponding to a selected preview.

DETAILED DESCRIPTION

Figure 4:
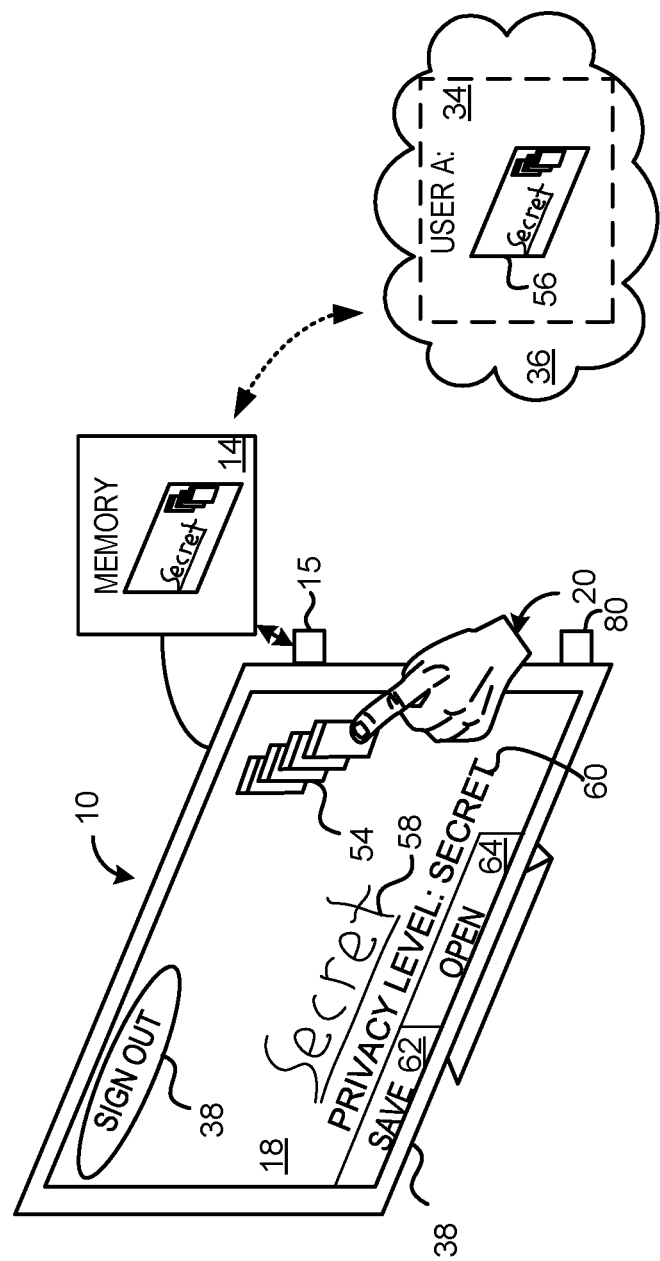
FIG. 4 depicts the computing system of FIGS. 1A-1D further configured to create virtual sticky-notes and recognize privacy keywords via handwriting recognition.

A whiteboard application executed by a computing system including an interactive display device is described herein. The whiteboard application is configured to quickly and efficiently upload and download data to and from a cloud-based storage device during a whiteboard application user session. Specifically, data may be generated via the whiteboard application and subsequently sent to a cloud-based storage system when a user provides credentials to a user account in the cloud-based storage system. Additionally, previews of files stored in the cloud-based storage device can also be presented via the interactive display device in response to the user entering user credentials. As a result, a user can not only easily offload desired content to a cloud-based storage system but also quickly preview content stored in the cloud-based storage system, thereby enhancing the current whiteboard session. In this way, a user can quickly capture content and send the captured content to a cloud-based system for later use as well as preview previously captured content stored in the cloud-based system.

FIG. 1A depicts a computing system 10 configured to store data from a whiteboard application 18 executed on the computing system 10. The computing system 10 may be configured to include an interactive display device 12 (e.g., interactive touch sensitive display device) and a memory 14 including instructions executable by a processor 15. The whiteboard application 18 may be stored in memory 14 as instructions executable by the processor 15. The computing system 10 may be further configured to record, in the memory 14, a whiteboard file 24. The whiteboard file 24 may include whiteboard data 16 input into the whiteboard application 18 by a user 20 via the interactive display device 12.

The interactive display device 12 may include a sensing device 80. The sensing device may include one or more of a capacitive touch sensor, an optical touch sensor, etc. The interactive display device 12 may include a liquid crystal display (LCD), an organic light-emitting diode (OLED), active-matrix organic light-emitting diode (AMOLED), projection display, etc., for presenting graphics. The interactive display device 12 is configured to receive and process ink inputs and touch inputs. It will be appreciated that an ink input includes an interactive input with a stylus 82. The interactive display device 12 may further be configured to receive and process multi-touch inputs. Additionally, it will be appreciated that the aforementioned inputs may be sent to the memory 14 and processor 15 for processing via the whiteboard application 18.

FIG. 1B depicts the computing system 10 further configured to display a login selector 26 on the interactive display device 12. The login selector 26 may be a soft button generated graphically by the interactive display device 12 or a hard button physically present on the interactive display device 12, itself. Upon detecting actuation of the login selector 26, the computing system 10 may then be further configured to identify the user 20 based on credentials of the user 20. In one example, the login selector 26 may be a soft button persistently displayed on the interactive display device 12 via the whiteboard application 18. In this way, a user can quickly select the login selector while the whiteboard application is executed. However, other whiteboard application user interface configurations have been contemplated, such as using biometric indicators including facial image recognition to log a user in, or using a device identifier received from a user device (e.g., mobile phone, watch, stylus, etc.) to log a user in, as described below.

FIG. 1C depicts the computing system 10 further configured to identify the user 20 via a sign in prompt 28 requesting the user 20 enter a user ID 30 and a password 32. The user 20 is identified by the computing system 10 as "USER A". The computing system 10 may also be further configured to identify the credentials of the user 20 via facial recognition. For example, the computing system 10 may be configured to compare a captured image of the user 20 captured with camera 40 to a stored profile image associated with a cloud-based account (e.g., online account) of the user 20. The camera 40 may be linked to the computing system 10. In addition, the computing system 10 may be configured to identify the user 20 by wirelessly detecting the credentials of the user stored in a linked portable device. In FIG. 1C, the linked portable device is depicted as cell phone 42 which may be configured to communicate wirelessly with the computing system 10. It should be noted, however, that the computing system 10 may be configured to wirelessly detect the credentials of a user 20 via another suitable device, such as a security token (e.g., fob), stylus, or watch.

FIG. 1D depicts the computing system 10 further configured to access a user account 34 on a cloud-based storage system 36. The user account 34 corresponds to the identity of the user 20 established by the computing system 10, as described above with respect to FIG. 1C. Upon accessing the user account 34, the computing system 10 may be configured to upload the whiteboard file 24 from the memory 14 of the computing system 10 to the user account 34. For example, the computing system may be configured to display on the interactive display device 12 a save selector 62 and, upon detecting actuation of the save selector 62 by the user 20, to upload the whiteboard file 24 to the user account 34.

Turning briefly to FIG. 2A, the computing system 10 may be further configured to display a logout selector 38 on the interactive display device. As shown in FIG. 2B, the computing system 10 may be then configured to revoke access to the user account 34 upon detecting actuation of the logout selector 38 by the user 20. Additionally, previews of the files stored in the cloud-based storage system may be removed from the interactive display device upon detecting actuation of the logout selector. The previews are discussed in greater detail herein.

Turning next to FIG. 3A, the computing system 10 may be further configured to retrieve previews 44 of stored whiteboard files 46 from the user account 34 on the cloud-based storage system 36. For example, the computing system 10 may be configured to display an open selector 64 on the interactive display device 12 and, upon detecting actuation of the open selector 64 by the user 20, to retrieve previews 44 of the stored whiteboard files 46 from the user account 34. The computing system may then be configured to display the previews 44 on the interactive display device 12. The previews 44 may be displayed by the computing device as a horizontal strip of preview images, with the preview images grouped chronologically. The previews 44 may be further grouped into folders. Additionally or alternatively, the previews may be presented as tiles (e.g., tiles aligned in a grid pattern) or stacked with each preview having a different z-order. The computing system 10 may be further configured to allow the user 20 to select one of the previews 44 via the interactive display device 12. Upon detecting a selection by the user 20, the computing system 10 may be configured to retrieve the stored whiteboard file 46 corresponding to the selected preview 44. As shown in FIG. 3B, the computing system 10 may then be configured to display the stored whiteboard file 46 on the interactive display device 12. The whiteboard application may be configured to enable the user to manipulate the whiteboard file, such as adding additional content, erasing content, modifying content, etc. For instance, a user may implement an ink input and/or touch input to generate additional graphics (e.g., alphanumeric symbols) in the whiteboard file.

Turning back to FIG. 1D, the computing system 10 may be further configured to display a second login selector 50 on the interactive display device 12. The computing system 10 may be configured to identify a second user 52 based on credentials of the second user 52 after detecting actuation of the second login selector 50 by the second user 52. The computing system 10 may then be configured to access a second user account on a cloud-based storage system corresponding to the identity of the second user 52 and upload the whiteboard file 24 from the memory 14 of the computing system 10 to the second user account. Although only the user account 34 is depicted in FIG. 1D, it should be noted that the computing system 10 may be configured to upload the whiteboard file 24 from the memory 14 to the second user account, as well. For example, it should be further noted that the computing system 10 may be configured to allow multiple users to operate in a split-screen mode wherein the whiteboard data from one predetermined half of the interactive display device is uploaded to the user account of the first user, and the whiteboard data from the other half may be uploaded to the user account of the second user. In another example, multiple users may be able to select portions of the whiteboard data and upload only the selected portion to their user account.

Turning next to FIG. 4, the computing system 10 may be configured to create virtual sticky-notes 54 via the interactive display device 12. The virtual sticky-notes 54 may contain content such as text input by the user and may be associated with a location or an element in the whiteboard data. For example, if a virtual sticky-note 54 is placed on a location within the whiteboard data of the whiteboard application 18, the virtual sticky-note 54 will remain in that location even if the whiteboard data is scrolled or resized on the interactive display device 12. The virtual sticky-notes 54 may also be configured such that multiple virtual sticky-notes may be stacked, resized, or arranged on the screen by the user 20. The computing system 10 may be further configured to record the virtual sticky-notes 54 in the memory 14 and to upload the virtual sticky-notes 54 to the user account 34 as a part of a whiteboard file 56. As such, the virtual sticky-notes can be stored on the computing system 10 and in user account 34 of the user 20.

FIG. 4 further depicts the computing system 10 configured to detect a privacy keyword 58 via handwriting recognition on the interactive display device 12. In the example shown in FIG. 4, the computing system 10 is configured to detect the word "Secret" or another suitable privacy keyword, such as confidential, private, etc., via handwriting recognition. The computing system 10 may then be configured to assign a privacy level 60 to the whiteboard file 56 based on the privacy keyword 58. The computing system may then be configured to restrict access to the whiteboard file 56 based on the privacy level 60. For example, the computing system 10 may be configured to restrict access to the whiteboard file 56 by locking the file and not allowing any unauthorized users to upload the whiteboard file 56. Alternately, the computing system 10 may be configured to restrict access to a whiteboard file 56 by not displaying a preview of the file among the previews of stored files retrieved from the user account 34 if unauthorized users are currently logged into the computing system 10. In another example, the computing system 10 may restrict access to a whiteboard file 56 by displaying a warning message when an additional user logs into the computing system 10, if the additional user is not authorized to upload the whiteboard file 56.

Figure 5A:
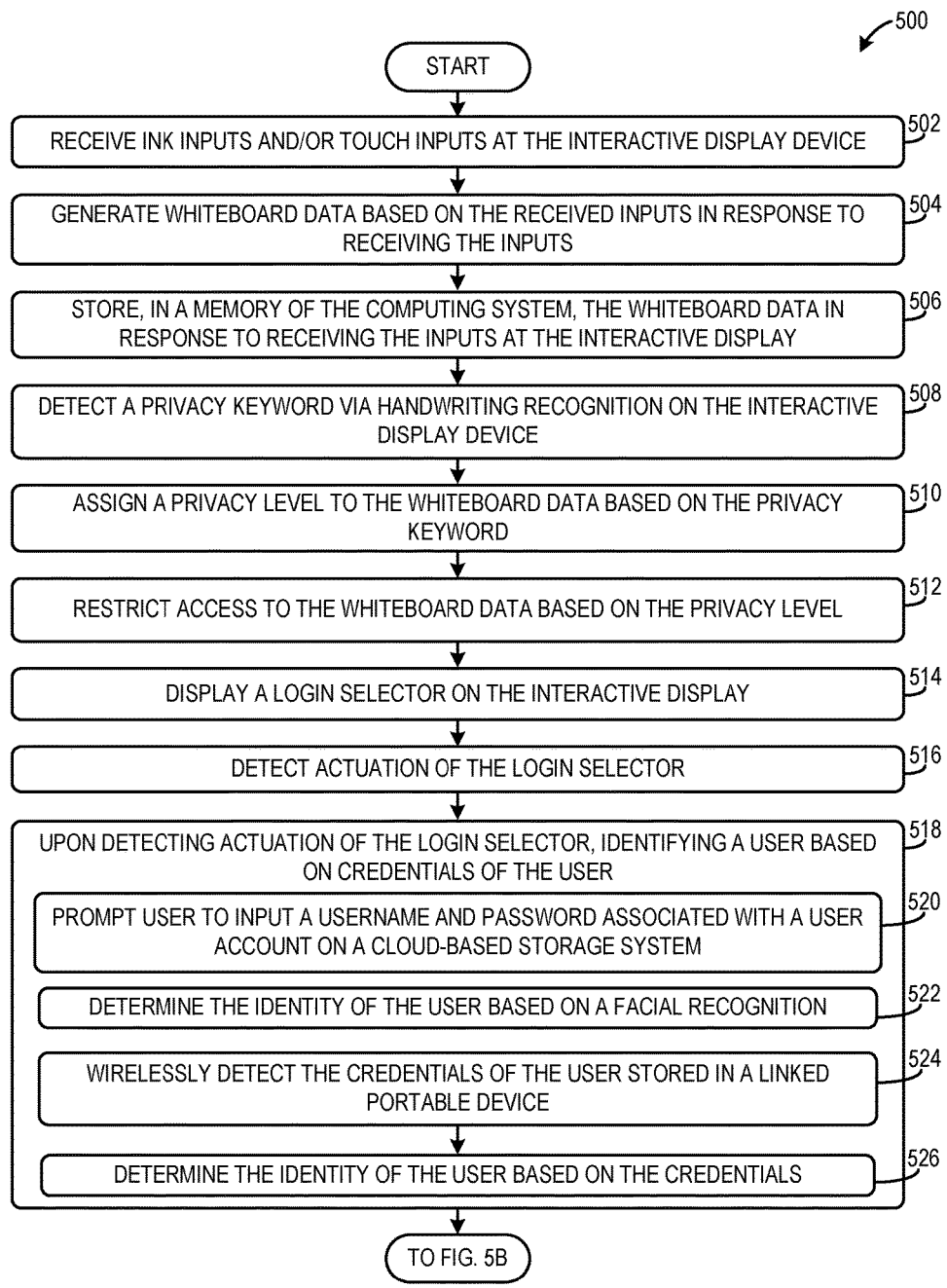
FIGS. 5A and 5B depict a flowchart for a method for storing data from a whiteboard application executed on the computing system in accordance with an embodiment of the present disclosure.

FIG. 5 is a flowchart depicting a method 500 of storing data from a whiteboard application executed on a computing system including an interactive display device. At 502, the method 500 includes receiving ink inputs and/or touch inputs at the interactive display device. It will be appreciated that the ink inputs may be implemented via a stylus and the touch inputs may be implemented via digits of a user, for instance.

Next at 504 the method includes generating whiteboard data based on the received inputs in response to receiving the inputs. In one example, the whiteboard data is in a data format specific to the whiteboard application. However, other whiteboard data formats have been contemplated. Further in one example, the whiteboard data includes at least one of modifiable ink input data, touch input data, and sticky-note data associated with a location or another element in the whiteboard data. It will be appreciated that the sticky-note data may mimic the functionality of physical sticky notes on a physical whiteboard.

At 506 the method includes storing, in a memory of the computing system, the whiteboard data in response to receiving the inputs at the interactive display. In one example, the whiteboard data may be stored in the memory in direct response to receiving the inputs at the interactive display. In the context of the invention direct response means that there are not intervening input commands implemented between the corresponding actions. Next at 508 the method includes detecting a privacy keyword via handwriting recognition on the interactive display device and at 510 the method includes assigning a privacy level to the whiteboard data based on the privacy keyword. The privacy keyword may be "secret", "classified", "confidential", etc. At 512 the method includes restricting access to the whiteboard data based on the privacy level. In this way, a user may provide increased security to data quickly and intuitively through interaction with the interactive display device.

At 514 the method includes displaying a login selector on the interactive display and at 516 the method includes detecting actuation of the login selector. Detecting actuation of the login selector may include detecting actuation of a button via user input (e.g., ink input, touch input, mouse input, etc.), for instance. At 518 the method includes upon detecting actuation of the login selector, identifying a user based on credentials of the user. Identifying the user based on the credential of the user may include at 520 prompting user to input a username and password associated with a user account on a cloud-based storage system. Additionally or alternatively, identifying the user based on the credentials of the user may include at 522 determining the identity of the user based on a facial recognition. Additionally or alternatively, identifying the user based on the credential of the user may include at 524 wirelessly detecting the credentials of the user stored in a linked portable device and at 526 determining the identity of the user based on the credentials. In one example, the linked portable device is one of a stylus, mobile computing device, and security token device. Thus, the credentials may be supplied by at least one of a stylus, mobile computing device, and security token device via wireless communication. In this way, a device associated with the user may be used to quickly identify the identity of the user.

Figure 5B:
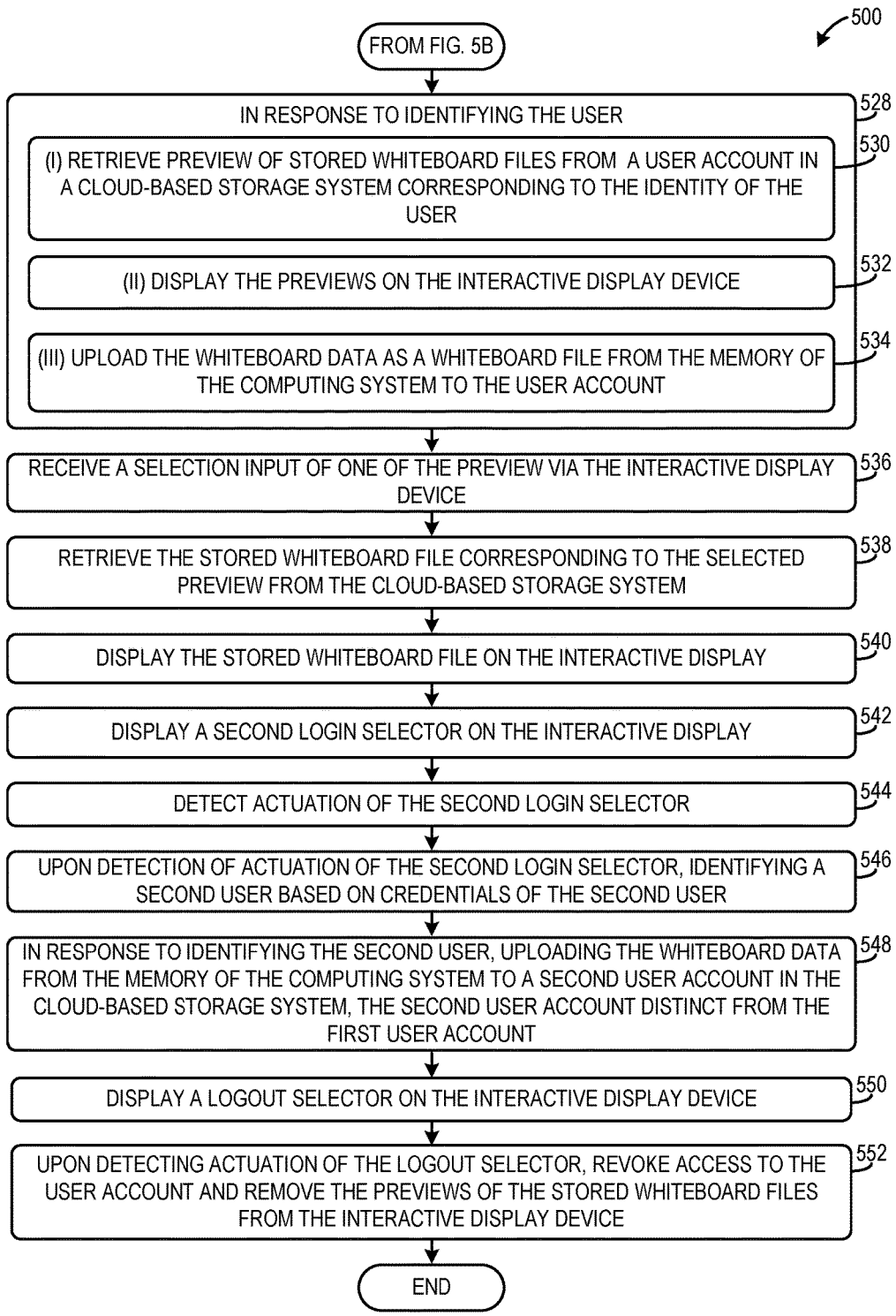

Now turning to FIG. 5B, the method includes at 528-534 in response to identifying the user (i) retrieving previews of stored whiteboard files from a user account in a cloud-based storage system corresponding to the identity of the user, (ii) displaying the previews on the interactive display device, and (iii) uploading the whiteboard data as a whiteboard file from the memory of the computing system to the user account. In this way, whiteboard data may be quickly pushed and pulled from the user account in the cloud-based storage system. In one example, the uploaded whiteboard data only includes a selected portion of data presented on the interactive touch sensitive display associated with the whiteboard application. For instance, a user may select a portion of the data via an ink input, touch gesture, etc., indicating the portion of data they would like to be uploaded. Still further in other examples, a stylus may be associated with a user and only the portion of whiteboard data generated by the specific stylus may be uploaded to the cloud-based storage system. However, in other examples all of the whiteboard data presented on the interactive display may be uploaded to the cloud-based storage system.

At 536 the method includes receiving a selection input of one of the previews via the interactive display device. Next at 538 the method includes retrieving the stored whiteboard file corresponding to the selected preview from the cloud-based storage system. At 540 the method includes displaying the stored whiteboard file on the interactive display and at 542 the method includes displaying a second login selector on the interactive display. At 544 the method includes detecting actuation of the second login selector. At 546 the method includes upon detection of actuation of the second login selector, identifying a second user based on credentials of the second user. Next at 548 the method includes in response to identifying the second user, uploading the whiteboard data from the memory of the computing system to a second user account in the cloud-based storage system, the second user account distinct from the first user account. At 550 the method includes displaying a logout selector on the interactive display device. Next at 552 the method includes upon detecting actuation of the logout selector, revoking access to the user account and removing the previews of the stored whiteboard files from the interactive display device.

The above described systems and methods provide the potential advantage that a user can quickly pull and push data to and from a cloud-based storage system. As a result, the users can quickly and intuitively acquire relevant data during a collaborative session for use at a later time. Furthermore, previously stored files are presented during the current whiteboard session for use during the current whiteboard session, if desired, further expanding the content that can be used in a single session. In this way, data from multiple whiteboard sessions can be provided in a single interface further enhancing the current whiteboard session by providing greater amount of collaborative content. As a result, the functionality of the whiteboard is expanded to provide a user with quick and efficient access to cloud-based content. In this way, content from more than one whiteboard session may be linked via a cloud-based storage system enabling the user to link content from multiple whiteboard sessions, if desired.

In some embodiments, the methods and processes described herein may be tied to a computing system of one or more computing devices. In particular, such methods and processes may be implemented as a computer-application program or service, an application-programming interface (API), a library, and/or other computer-program product. Specifically, the methods and processing herein may be tied to the computing system discussed above with regard to FIGS. 1-4.

Figure 6:
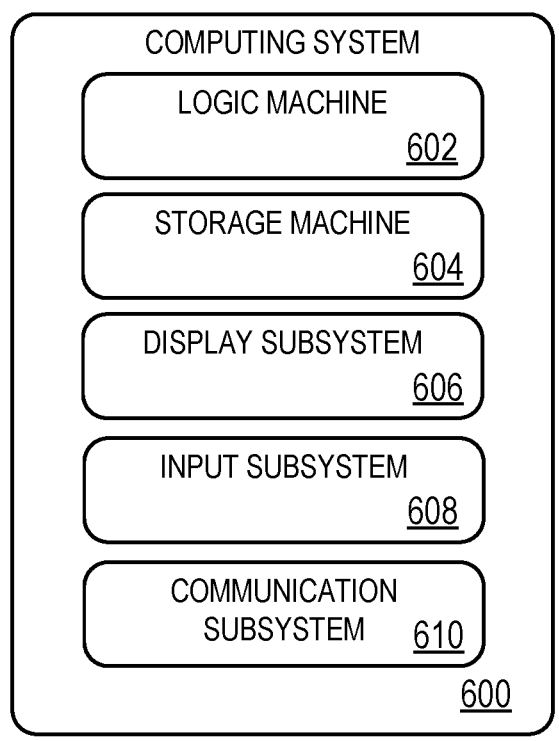
FIG. 6 schematically depicts a non-limiting embodiment of a computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of a touch-screen display device, as well as any other suitable computing system, including but not limited to game consoles, one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may also include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect, a method of storing data from a whiteboard application executed on a computing system including an interactive display device is provided. The method includes, storing, in a memory of the computing system, whiteboard data input to the whiteboard application in response to user interaction with the interactive display device, displaying a login selector on the interactive display device, and upon detecting actuation of the login selector; identifying the user based on credentials of the user; in response to identifying the user, (i) retrieving previews of stored whiteboard files from a user account in a cloud-based storage system corresponding to the identity of the user, (ii) displaying the previews on the interactive display device, and (iii) uploading the whiteboard data as a whiteboard file from the memory of the computing system to the user account.

In this aspect, the method may further include displaying a logout selector on the interactive display device; and upon detecting actuation of the logout selector, revoking access to the user account and removing the previews of the stored whiteboard files from the interactive display device.

In this aspect, identifying the user based on credentials of the user may further comprise: prompting the user to input a username and a password associated with a user account on a cloud-based storage system.

In this aspect, identifying the user based on credentials of the user may further comprise: determining the identity of the user based on a facial recognition.

In this aspect, identifying the user based on credentials of the user may further comprise: wirelessly detecting the credentials of the user stored in a linked portable device; and determining the identity of the user based on the credentials.

In this aspect, the linked portable device may be one of a stylus, mobile computing device, and security token device.

In this aspect, the method may further include receiving a selection input of one of the previews via the interactive display device; retrieving the stored whiteboard file corresponding to the selected preview from the cloud-based storage system; and displaying the stored whiteboard file on the interactive display device.

In this aspect, the method may further include displaying a second login selector on the interactive display device; upon detecting actuation of the second login selector, identifying a second user based on credentials of the second user; and in response to identifying the second user, uploading the whiteboard data from the memory of the computing system to a second user account in the cloud-based storage system, the second user account distinct from the first user account.

In this aspect, the method may further include detecting a privacy keyword via handwriting recognition on the interactive display device; assigning a privacy level to the whiteboard data based on the privacy keyword; and restricting access to the whiteboard data based on the privacy level.

In this aspect, the whiteboard data may be in a data format specific to the whiteboard application.

In this aspect, the uploaded whiteboard data may only include a selected portion of data presented on the interactive touch sensitive display associated with the whiteboard application.

According to another aspect, a computing system is provided which includes an interactive touch sensitive display device; code stored in memory executable by a processor to: store, in a memory of the computing system, whiteboard data input to the whiteboard application in direct response to user interaction with the interactive touch sensitive display device; display a login selector on the interactive touch sensitive display device; upon detecting actuation of the login selector, identifying the user based on credentials of the user; and in response to identifying the user, (i) retrieve previews of stored whiteboard files from the user account on the cloud-based storage system, (ii) display the previews on the interactive touch sensitive display device, and (iii) upload the whiteboard data as a whiteboard file from the memory of the computing system to the user account.

In this aspect, the whiteboard data may be in a data format specific to the whiteboard application.

In this aspect, the whiteboard data may include at least one of modifiable ink input data, touch input data, and sticky-note data associated with a location or another element in the whiteboard data.

In this aspect, the computing system may further include code stored in memory executable by a processor to; detect a privacy keyword via handwriting recognition on the interactive touch sensitive display device; assign a privacy level to the whiteboard data based on the privacy keyword; and restrict access to the whiteboard data based on the privacy level.

In this aspect, the credentials may be supplied by at least one of a stylus, mobile computing device, and security token device via wireless communication.

In this aspect, the whiteboard data may be uploaded in direct response to identifying the user.

According to another aspect, a method of storing data from a whiteboard application executed on a computing system including an interactive touch sensitive display device is provided. The method includes storing, in a memory of the computing system, whiteboard data input to the whiteboard application in direct response to user interaction with the interactive touch sensitive display device, the whiteboard data includes at least one of modifiable ink input data, touch input data, and sticky-note data associated with a location or another element in the whiteboard data; displaying a login selector on the interactive touch sensitive display device; upon detecting actuation of the login selector, identifying the user based on credentials of the user; and in response to identifying the user, (i) retrieving previews of stored whiteboard files from the user account on the cloud-based storage system, (ii) displaying the previews on the interactive touch sensitive display device, and (iii) uploading the whiteboard data as a whiteboard file from the memory of the computing system to the user account.

In this aspect, the whiteboard data may be uploaded in direct response to identifying the user.

In this aspect, the uploaded whiteboard data may only include a selected portion of data presented on the interactive touch sensitive display associated with the whiteboard application.

The invention claimed is:

1. A method of storing data from a whiteboard application executed on a computing system including an interactive display device, the method comprising:
in an initial session on the interactive display device:
    associating whiteboard data with a first user, the whiteboard data input to the whiteboard application responsive to interaction of the first user with the interactive display device, the first user being determined to be authorized to access the whiteboard data;
    detecting a privacy keyword inputted by the first user via handwriting recognition on the interactive display device;
    assigning a privacy level to the whiteboard data associated with the first user based on the privacy keyword;
    uploading the whiteboard data as a whiteboard file from a memory of the computing system to the first user account;
in a subsequent session on the interactive display device:
    detecting actuation of a first login selector by the first user;
    determining that the first user is authorized to access the whiteboard data based on the credentials of the first user and the privacy level of the whiteboard data;
    in response to determining that the first user is authorized to access the whiteboard data,
        (i) retrieving previews of stored whiteboard files from a first user account in a cloud-based storage system corresponding to the identity of the first user; and
        (ii) displaying the previews on the interactive display device;
    detecting actuation of a second login selector by a second user;
    determining credentials of the second user to identify the second user in response to detecting actuation of the second login selector;
    determining that the second user is not authorized to access the whiteboard data associated with the first user based on the privacy level and the credentials of the second user; and
    in response to determining that the second user is not authorized to access the whiteboard data, restricting the second user's access to the whiteboard data associated with the first user by removing the previews from the interactive display device, wherein the previews are removed from the interactive display device when both the first user and the second user are lowed into the whiteboard application.

2. The method of claim 1, where the credentials of the second user include biometric data.

3. The method of claim 2, where the biometric data includes facial image recognition data.

4. The method of claim 1, further comprising, subsequent to identifying the second user, displaying a plurality of previews of authorized whiteboard data associated with the second user.

5. The method of claim 1, where detecting the privacy keyword includes detecting an ink input implemented via a stylus or a digit of the first user interacting with the interactive display device.

6. The method of claim 1, further comprising displaying a warning message when the second user is restricted from accessing the whiteboard data.

7. A computing system comprising:
an interactive touch sensitive display device;
code stored in memory executable by a processor to:
in an initial session on the interactive display device:
    associate whiteboard data with a first user, the whiteboard data input to the whiteboard application responsive to interaction of the first user with the interactive display device, the first user being determined to be authorized to access the whiteboard data;
    detect a privacy keyword inputted by the first user via handwriting recognition on the interactive display device;
    assign a privacy level to the whiteboard data associated with the first user based on the privacy keyword;
    upload the whiteboard data as a whiteboard file from a memory of the computing system to the first user account;
in a subsequent session on the interactive display device:
    detect actuation of a first login selector by the first user;
    determine that the first user is authorized to access the whiteboard data based on the credentials of the first user and the privacy level of the whiteboard data;
    in response to determining that the first user is authorized to access the whiteboard data,
        (i) retrieve previews of stored whiteboard files from a first user account in a cloud-based storage system corresponding to the identity of the first user; and
        (ii) display the previews on the interactive display device;
    detect actuation of a second login selector by a second user;
    identify the second user based on credentials of the second user in response to detecting actuation of the second login selector;

determine that the second user is not authorized to access the whiteboard data associated with the first user based on the privacy level and the credentials of the second user; and in response to determining that the second user is not authorized to access the whiteboard data, restrict the second user's access to the whiteboard data associated with the first user by removing the previews from the interactive display device, wherein the previews are removed from the interactive display device when both the first user and the second user are lowed into the whiteboard application.

8. The computing system of claim 7, where the credentials of the second user include biometric data.

9. The computing system of claim 8, where the biometric data includes facial image recognition data.

10. The computing system of claim 7, further comprising code stored in memory executable by the processor to, subsequent to identifying the second user, display a plurality of previews of authorized whiteboard data associated with the second user.

11. The computing system of claim 7, where detecting of the privacy keyword includes detecting an ink input implemented via a stylus or a digit of the first user interacting with the interactive display device.

\* \* \* \* \*